(12) United States Patent
Carney et al.

(10) Patent No.: US 11,629,801 B2
(45) Date of Patent: Apr. 18, 2023

(54) UNBONDED REINFORCED PLASTIC PIPE

(71) Applicant: Polyflow LLC, Midland, TX (US)

(72) Inventors: Matthew Carney, Midland, TX (US); Spencer Green, Midland, TX (US); Raymond Nicholas Burke, Midland, TX (US)

(73) Assignee: Polyflow LLC, Midland, TX (US)

( * ) Notice: Subject to any disclaimer, the term of this patent is extended or adjusted under 35 U.S.C. 154(b) by 0 days.

(21) Appl. No.: 17/187,231

(22) Filed: Feb. 26, 2021

(65) Prior Publication Data

US 2022/0275888 A1 Sep. 1, 2022

(51) Int. Cl.
*F16L 11/20* (2006.01)
*F16L 11/04* (2006.01)

(52) U.S. Cl.
CPC ............ *F16L 11/20* (2013.01); *F16L 11/04* (2013.01)

(58) Field of Classification Search
CPC .................................. F16L 11/04; F16L 11/20
USPC ........................................................ 138/118
See application file for complete search history.

(56) References Cited

U.S. PATENT DOCUMENTS

| | | | | |
|---|---|---|---|---|
| 4,009,734 A * | 3/1977 | Sullivan | ............... | B29C 53/12 138/125 |
| 5,601,893 A * | 2/1997 | Strassel | ............... | F16L 11/14 138/131 |
| 7,238,400 B2 * | 7/2007 | Gerez | ............... | F16L 11/083 428/36.1 |
| 8,439,603 B2 * | 5/2013 | Witz | ............... | F16L 59/153 405/169 |
| 9,400,067 B2 * | 7/2016 | Felix-Henry | ............ | F16L 11/10 |
| 9,458,956 B2 * | 10/2016 | Gudme | ............... | F16L 11/16 |
| 9,844,921 B2 * | 12/2017 | Ragner | ............... | F16L 11/12 |
| 2005/0189029 A1 * | 9/2005 | Quigley | ............... | F16L 11/082 138/125 |
| 2012/0222770 A1 | 9/2012 | Kristiansen et al. | | |
| 2015/0354731 A1 * | 12/2015 | Ragner | ............... | F16L 57/06 138/119 |
| 2017/0299092 A1 * | 10/2017 | Larsen | ............... | F16L 11/12 |
| 2018/0299039 A1 | 10/2018 | Warnakulasuriya | | |
| 2019/0195397 A1 | 6/2019 | Berardi | | |

FOREIGN PATENT DOCUMENTS

KR 1020100077597 A 7/2010
WO 20130135244 A1 9/2013

OTHER PUBLICATIONS

The International Search Report and the Written Opinion of the ISA/KR for PCT/US2022/070729, dated Jun. 2, 2022 (13 Pages).

* cited by examiner

*Primary Examiner* — Craig M Schneider
*Assistant Examiner* — David R Deal
(74) *Attorney, Agent, or Firm* — Troutman Pepper Hamilton Sanders LLP; Ryan A. Schneider; Dustin B. Weeks

(57) ABSTRACT

Pipe body for an unbonded reinforced thermoplastic pipe (uRTP), the pipe body including a fluid retaining liner, an intermediate layer located radially outwardly of the fluid retaining liner, and a protective sheath located radially outwardly of the intermediate layer. The pipe body includes an end portion for terminating the pipe body at an end fitting. At the end portion, the intermediate layer is bonded to the fluid retaining liner. Away from the end portion, the intermediate layer remains unbonded to the fluid retaining liner.

14 Claims, 11 Drawing Sheets

UNBONDED REINFORCED PLASTIC PIPE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The present invention relates to multilayer unbonded reinforced thermoplastic pipe (uRTP) or a pipe body for said pipe. In particular, but not exclusively, the present invention relates to multilayer unbonded reinforced thermoplastic polymer pipe with a bonded end portion.

2. Description of Related Art

Reinforced thermoplastic pipe (RTP) may either be of an unbonded construction, where the layers of the pipe are unbonded to each other, i.e. the inner fluid containing polymer liner layer is not bonded to the reinforcement layer, which is in turn not bonded to the outer protective sheath polymer layer, or of a bonded construction, i.e. all layers are bonded to each other as part of the pipe manufacturing resulting in a pipe which is in effect a single, consolidated layer comprising sub-layers. RTP of either type may be suitable for use in transporting and/or distributing oilfield fluids, such as water, gas (methane, ethane, $CO_2$ etc.) and/or the transport and distribution of hydrocarbon liquids, or other fluids such as hydrogen. RTP may be used onshore (over land) or in very shallow water applications (for instance less than 50 m water depth).

It should be noted that multilayer unbonded RTP (uRTP) is distinct from bonded RTP, which may be suitable for similar applications, but is manufactured differently. In comparison with bonded RTP an unbonded RTP may be manufactured more quickly (as there is no need to bond or consolidate layers along the full length of the pipe, nor additional inspection to confirm such bonding is achieved), and is therefore more cost effective, and results in pipe which is more flexible during handling and installation, being able to maintain and operate at a smaller bend radius without risk of damage to the pipe structure.

Structurally, multilayer uRTP may comprise a simple construction, comprising two or more polymer layers each of which may be similar or different polymer types (see for example US2018/0187802A1). See also American Petroleum Institute Specification 15S as a reference for these types of pipe. The inner and outer polymer layers (often termed a liner and protective sheath respectively) are extruded polymers of at least one type of polymer. Aptly for some applications the inner polymer layer may comprise sub-layers similar or different polymer compositions which are co-extruded to form a liner.

The multilayer uRTP related to the invention may be suitable for internal pressures up to 5000 psi. Multilayer uRTP may comprise medium density polyethylene (MDPE), high density polyethylene (HDPE), cross-linked polyethylene (XLPE), polyethylene of raised temperature (PE-RT), polypropylene (commercial polyolefin grades or grades with additives for temperature and chemical stability), polyamides (e.g. PA-12, PA-66, PA-6), thermoplastic elastomers, flexible polyvinyl chloride, Acrylonitrile butadiene styrene (ABS), polyphenylene sulfide (PPS), perfluoro alkoxy alkanes (PFA), perfluoro methyl alkoxy (MFA), or other polymers or polymer alloys. Multilayer uRTP may also comprise filled polymers where the polymer contains a portion of a filler material, such as fibers or particles.

The multilayer uRTP may comprise a multi-layer structure incorporating at least one intermediate reinforcement layer to withstand internal pressure and/or tension in the pipe when in use. Such reinforcement layers may comprise spirally wound reinforcement tapes. Such reinforcement tapes may comprise at least one polymer layer reinforced with filaments of any or a combination of glass, carbon, basalt, aramid, tensilized polyester or metal fibers or wires. In this case the reinforcements may be substantially aligned in the longitudinal direction of the tape and embedded within, or adhered to, or sandwiched between, the at least one polymer layer. A reinforcement tape may also comprise warp and weft fibers of similar or different materials or sizes so that the longitudinally aligned fibers/bundles/strands are bound or fixed in position with respect to one another in a woven fiber tape. The reinforcements may comprise long discrete fibers, or may be bundled, or twisted together as strands. Alternatively, reinforcement fibers may be braided around the pipe, or bundles of fibers may be constrained within a braided element, the braided elements being spirally wound or braided around the inner polymer barrier layer of the pipe as reinforcements. Fibers and/or strands or braids of fibers may be wound around the pipe in a helical manner, with lay angles optimized for pipe performance (the higher the angle the greater the pressure retainment capability, the lower the angle the greater the tension capability), or interwoven into a braid around the pipe. Layers of reinforcements may be applied sequentially at different angles to optimize and torsionally balance the structure during manufacture and during use.

The end fittings of a uRTP may be used for connecting segments of uRTP body together or for connecting them to terminal equipment such as well-head flange connectors. As such, amongst other varied uses, uRTP can be used to provide a pipe assembly for transporting fluids from a well-head location to an export terminus, or to a refinery. In such a pipe assembly a first segment of uRTP may be connected to one or more further segments of uRTP. Each segment of uRTP includes at least one end fitting.

A schematic cross-section of a known swage end fitting 300 is shown in FIGS. 3a and 3b. The end fitting 300 includes an end fitting inner body section 301, which includes an internal bore 302 running along its length. The end fitting inner body section 301 and outer tubular case 307 are typically made from steel, stainless steel or aluminum or other such rigid material. The end fitting 300 may also comprise at least two generally tubular components (the inner body section 301 and outer tubular case 307) welded together at one end of the outer tubular case 307 with a fillet weld 308 (or otherwise rigidly joined together). Alternatively, the end fitting may be made from a single piece by machining from a tube or billet, or using additive manufacturing techniques to build up the component. Towards a first end of the end fitting 305 there is defined an opening to a passageway 303. The passageway 303 defines a blind annular bore. In use, an end of a segment of uRTP pipe body 100 is inserted into the passageway 303. The inside surfaces of the passageway 303 may comprise gripping means, for example teeth or ridges (not shown), which protrude into the passageway 303. After the end of a pipe is inserted into the passageway 303 the outer tubular case 307 is swaged radially inwards over a length 311, as shown in FIG. 3b, reducing the diameter thereof, at which point the teeth or ridges grip the inner and/or outer surfaces of the pipe. Vent holes 310 may be incorporated into the tubular outer case to prevent build-up of gas at the blind end of the passageway 303 during swaging. It will be understood that for some designs of swaged end fitting the inner body section may also, or alternatively, be a component which is swaged to create a gripping force on the end portion of an uRTP body.

At a further end of the end fitting 300 is a connector flange 306. This is formed as a substantially disk-like flared region on the end fitting inner body section 301 and may incorporate an array of through-holes for connecting fasteners towards the outer circumference 304. It will be known by those skilled in the art that the flange connector portion of the inner body section may be integrally formed or may be a separate component connected to the inner body section via, for example, a butt weld joint in the neck section 309. Likewise, it will be appreciated that other types of connector (for instance a butt-welded connection, a clamped connection, etc.) may be desirable and readily integrated or connected for providing means to establish a fluid seal and continuity between sections of uRTP or between uRTP and other equipment. The connector can be connected directly to a matching connector of a further end fitting body of an adjacent segment of uRTP body. This can be done using bolts or some other form of securing mechanism. In such a configuration the end fittings would be located in a back-to-back configuration. Alternatively, the connector 304 may be connected to well-head equipment or other pipeline or process equipment.

The end portion of a uRTP, where the connection between the uRTP pipe body and the end fitting is located, may be subjected to various types of loading during use. It is therefore critically important to ensure that the connection between the end fitting and the uRTP body remains secure, does not suffer unduly from age-related deterioration or failure, nor induces additional stress or damage into the reinforcement layer of the uRTP. Being an unbonded construction, layers of the uRTP body may, during the end fitting application process, become displaced with respect to their designed or optimum configuration. Additionally during the swaging process, when the tubular outer case 307 is radially squeezed to a smaller diameter onto the uRTP body, there is a risk that elements of the reinforcement layer in the pipe are damaged, reducing their strength and ability to withstand both pressure loading and tension forces in the pipe during service.

A specific issue with the termination of uRTP is being able to create and maintain a seal against the inner polymer fluid barrier layer while at the same time ensuring the securing of the reinforcing layer within the end fitting, and controlling the transition of strain in the uRTP body as it body transitions out from the constraints of the end fitting.

It is an aim of the present disclosure to overcome some or all of the above-mentioned limitations.

BRIEF SUMMARY OF THE INVENTION

According to a first aspect of the present invention there is provided a pipe body for an unbonded reinforced thermoplastic pipe (uRTP), or an unbonded reinforced thermoplastic pipe body. The pipe body comprises an inner fluid retaining liner; an intermediate layer, for example an intermediate reinforcement layer, located radially outwardly of the fluid retaining liner; and a protective sheath (which may also be referred to as an outer cover in API 15S) located radially outwardly of the intermediate layer; wherein the pipe body comprises an end portion for terminating the pipe body at an end fitting, wherein, at the end portion, the intermediate layer is bonded to the fluid retaining liner, and, away from the end portion, the intermediate layer remains unbonded to (i.e. is unbonded to) the fluid retaining liner.

This is advantageous in that bonding the intermediate layer to the fluid retaining liner reinforces the fluid retaining liner. This strengthens and stabilizes the connection between the end fitting and the fluid retaining liner. Specifically, the reinforcement of the fluid retaining liner reduces the hoop strain therein when the fluid retaining liner end portion is inserted into the end fitting and during the swaging process to compress the end fitting on the end of the pipe body end portion. By reducing the hoop strain in the fluid retaining liner, the fluid retaining liner is less prone to excessive local plastic deformation and/or fracture; specifically it is possible to better control the strain transition from the constrained, swaged end portion of the pipe body within the end fitting, to the unconstrained remaining length of unbonded pipe body. In addition, by increasing the stability of the layers during the swaging process, the end fitting is less prone to slippage under internal or external pressure, or cyclic pressure loading, or under tension. Furthermore, by controlling the hoop strain transition as the pipe body exits the end fitting, the fluid retaining liner and intermediate reinforcement layer are less prone to localized creep which could risk damaging the reinforcements in the intermediate layer and result in the loss of pressure containment capability. Reinforcing the fluid retaining liner also increases the connection strength between the end fitting and the fluid retaining liner. By only bonding the end portion of the pipe body, the remainder of the pipe body is unbonded, and so flexibility of the pipe body is retained. Bonding the intermediate layer to the fluid retaining liner is also advantageous as it can reduce or eliminate the relative axial displacement of unbonded layers of pipe during the end fitting installation processes, particularly during swaging of the outer tubular case.

The length of the end portion may be between approximately 100 mm and 1000 mm, aptly between approximately 200 and 800 mm, for example 300 mm. The end portion is preferably of the same or a greater length than the length of the end fitting.

The intermediate layer may comprise a plurality of reinforcement filaments within a thermoplastic matrix or bonded to a thermoplastic tape. The filaments may be uniaxial, multiaxial, braided or woven.

The intermediate layer may comprise a plurality of windings of at least one tape element. The at least one tape element may comprise reinforcement filaments within a thermoplastic matrix, or bonded to a thermoplastic tape, wherein the axes of the reinforcement filaments are substantially parallel to the axis of the tape, or a braiding.

The reinforcement filaments may comprise fibers or wires. The reinforcement filaments may comprise at least one type of material selected from glass, metal, basalt, carbon, polyester or aramid. This is advantageous as the thermoplastic matrix allows the tape elements to be consolidated into a substantially unitary fiber-reinforced polymer material by melting the thermoplastic matrix.

The at least one tape element may be wound around the fluid retaining liner at an angle of between approximately 15° and 90° with respect to a central axis of the pipe body. The variation in possible tape angle allows reinforcement of the fluid retaining liner to be enhanced in the required loading direction. For example, tape windings at 15° may provide greater axial strength than tapes wound at 90°.

At the end portion the protective sheath polymer may optionally be stripped off the desired length of said end portion in order to access the underlying intermediate layer. That intermediate layer may then be bonded to the fluid retaining liner by melt bonding or by heat fusion. Put another way, at the end portion the intermediate layer may be bonded to the fluid retaining liner through the application of heat and pressure to the intermediate layer and/or the fluid retaining liner. The pressure may come from the radially inward squeezing force from a heat shrink tape, or from the application of a roller around or along the end portion applying progressive localized pressure to the outer surface of the intermediate layer, or by other suitable means. The temporary application of heat resistant tapes over the intermediate layer during the heating and pressurization process may be adopted to control the movement of the melted polymer matrix and/or prevent the pressuring means from sticking to the polymer during the act of applying pressure.

During the application of heat and pressure there may optionally be an internal support mandrel applied to maintain the shape and form of the end portion internal diameter, that mandrel being rigid or able to expand to support the end portion or even apply pressure from within the pipe body alternatively or simultaneously to that applied from the external side. Optionally heat may be applied also from the internal side through or via the mandrel.

The uRTP pipe may further comprise a cover layer located radially outwardly of the intermediate layer at the end portion. The cover layer may be a new or additional component (that is, the cover layer is additional to and separate from the fluid retaining liner, intermediate liner and protective sheath of the pipe body). The cover layer may protect the intermediate layer from environment conditions.

The cover layer may be bonded to the intermediate layer.

This is advantageous as the bonded fluid retaining liner and intermediate layer will be further reinforced, supported and protected by the cover layer. The further reinforcement enhances the benefits of bonding the intermediate layer to the fluid retaining liner, and so further strengthens the connection between the fluid retaining liner and the end fitting.

The cover layer may abut the protective sheath. The cover layer may be sealed to the protective sheath.

The cover layer may comprise at least one winding of a further tape element or sheet material, the at least one winding being oriented at substantially (e.g. close to or at) 90° with respect to a central axis of the pipe body. This is advantageous, as the fiber reinforcement increases the hoop stiffness of the fluid retaining liner at the end portion through its support of the intermediate layer, and so stabilizes and strengthens the connection between the fluid retaining liner and the end fitting.

The at least one further tape element may comprise reinforcement filaments within a thermoplastic matrix, or reinforcement filaments adhered to a backing tape, wherein the axes of the reinforcement filaments are substantially parallel to the axis of the tape. Alternatively, the reinforcement filaments may be braided or woven. The reinforcement filaments may comprise at least one type of material selected from glass, metal, basalt, carbon, polyester or aramid.

The cover layer may comprise an annular sleeve. The annular sleeve may be fiber-reinforced. The annular sleeve may be manufactured using a thermoplastic. The annular sleeve may be manufactured using a fiber reinforced thermoplastic. The annular sleeve may be of the same or a similar material to the protective sheath. The annular sleeve may be a part of the pipe body protective sheath. The annular sleeve may be extruded. The annular sleeve may comprise a heat-shrink material which may be applied and then activated with temperature to provide an intimate interface with the intermediate uRTP body layer.

This is advantageous, as the annular sleeve may be prefabricated, and assembled onto the pipe body at a work site, or in the field.

The protective sheath may comprise a thermoplastic material. The protective sheath may be extruded. The protective sheath may be manufactured from high density polyethylene, HDPE, or optionally raised temperature grades of polyolefins.

The fluid retaining liner may comprise a thermoplastic material. The fluid retaining liner may be manufactured using polyolefins, or fluoropolymers, or thermoplastic elastomers. The fluid retaining liner may be a monolayer or with multiple sub-layers. The fluid retaining liner may be manufactured using polyethylene of raised temperature, PE-RT. The fluid retaining liner may be extruded.

According to a second aspect of the present invention there is provided an unbonded reinforced thermoplastic pipe (uRTP), the uRTP comprising a pipe body and an end fitting, the pipe body comprising a fluid retaining liner; an intermediate layer located radially outwardly of the fluid retaining liner; a protective sheath located radially outwardly of the intermediate layer; wherein the pipe body comprises an end portion for terminating the pipe body at the end fitting, wherein, at the end portion, the intermediate layer is bonded to the fluid retaining liner, and, away from the end portion, the intermediate layer is unbonded to the fluid retaining liner, and, wherein, the end portion is inserted into an annular recess in the end fitting which is swaged onto the end portion of the pipe body.

According to a third aspect of the present invention there is provided a method of manufacturing a pipe body for an unbonded reinforced thermoplastic pipe (uRTP), the method comprising the steps of locating an intermediate layer radially outwardly of a fluid retaining liner; locating a protective sheath radially outwardly of the intermediate layer; bonding the intermediate layer to the fluid retaining liner only at an end portion of the pipe body, such that the intermediate layer is unbonded to the fluid retaining liner away from the end portion, the end portion being for terminating the pipe body at an end fitting.

The intermediate layer may comprise a plurality of windings of at least one tape element. Locating the intermediate layer radially outwardly of the fluid retaining liner may include winding the at least one tape element around the fluid retaining liner at an angle of between approximately 15° and 90° with respect to a central axis of the pipe body.

The method may comprise the further step of at least partly removing the protective sheath from the end portion of the pipe body before bonding the fluid retaining liner to the intermediate layer. This facilitates the bonding of the intermediate layer to the fluid retaining liner.

Bonding the intermediate layer to the fluid retaining liner may comprise the step of applying energy, e.g. heat, and optionally also pressure, directly to the intermediate layer and/or the fluid retaining liner.

The method may further comprise the step of applying or locating a cover layer radially outwardly of the intermediate layer at the end portion, for example at least substantially replacing any removed protective sheath over the length of the end portion.

Bonding the intermediate layer to the fluid retaining liner may comprise the step of applying energy, e.g. heat, to the protective sheath, or the cover layer, or both; that is, energy/heat may be applied to the intermediate layer via the protective sheath or the cover layer, while optionally pressure is also applied radially inwardly to an external surface of the protective sheath, and/or the cover layer.

Bonding the intermediate layer to the fluid retaining liner may comprise the step of applying energy, e.g. heat, to the fluid retaining liner, or the intermediate layer, or both, from the bore of the pipe body end portion; that is, energy/heat may be applied to the intermediate layer via the fluid retaining liner, while optionally pressure is also applied in a radially outward direction from the bore of the pipe body.

Bonding the intermediate layer to the fluid retaining liner may include melt bonding or heat fusing the intermediate layer to the fluid retaining liner.

Bonding the intermediate layer to the fluid retaining liner at an end portion of the pipe body may further include the step of locating a heat shrinkable layer radially outwardly of the intermediate layer before the application of heat, such that, upon the application of heat, the heat shrinkable layer shrinks and compresses the intermediate layer against the fluid retaining liner.

The method may further comprise the step of bonding the cover layer to the intermediate layer.

Bonding the cover layer to the intermediate layer may comprise the step of applying energy, e.g. heat, to the cover layer and/or intermediate layer and/or the fluid retaining liner, and optionally applying radial pressure from a radially outer free surface of the pipe body or a radially inner free surface of the pipe body, or both.

Bonding the cover layer to the intermediate layer may include melt bonding or heat fusing the cover layer to the intermediate layer.

The method may further comprise the step of abutting the cover layer against the protective sheath. The method may further comprise the step of sealing the cover layer to the protective sheath.

The cover layer may comprise at least one winding of a further tape element, the at least one winding being oriented at approximately 90° with respect to a central axis of the pipe body.

Locating the cover layer radially outwardly of the intermediate layer may include winding the further tape element around the intermediate layer.

The cover layer may be consolidated (e.g. cured, semi-cured, stitched, stapled) before it is located over the intermediate layer.

The cover layer may comprise an annular sleeve and locating the cover layer radially outwardly of the intermediate layer at the end portion may include the step of sliding the sleeve onto the intermediate layer.

The annular sleeve may be manufactured by winding the at least one further tape layer or sheet material into an annular shape.

Locating the cover layer radially outwardly of the intermediate layer at the end portion may include the step of wrapping the further tape layer or sheet material around the intermediate layer.

A pipe mandrel may be inserted into the end portion of the pipe body prior to the application of heat to the cover layer and/or intermediate layer and/or the fluid retaining liner. The pipe mandrel helps maintain the circularity of the fluid retaining liner during heating of the end portion.

These and other objects, features and advantages of the present invention will become more apparent upon reading the following specification in conjunction with the accompanying drawing figures.

BRIEF DESCRIPTION OF THE DRAWINGS

The accompanying Figures, which are incorporated in and constitute a part of this specification, illustrate several aspects described below.

In the drawings like reference numerals refer to like parts.

DETAILED DESCRIPTION OF THE INVENTION

Figure 1:
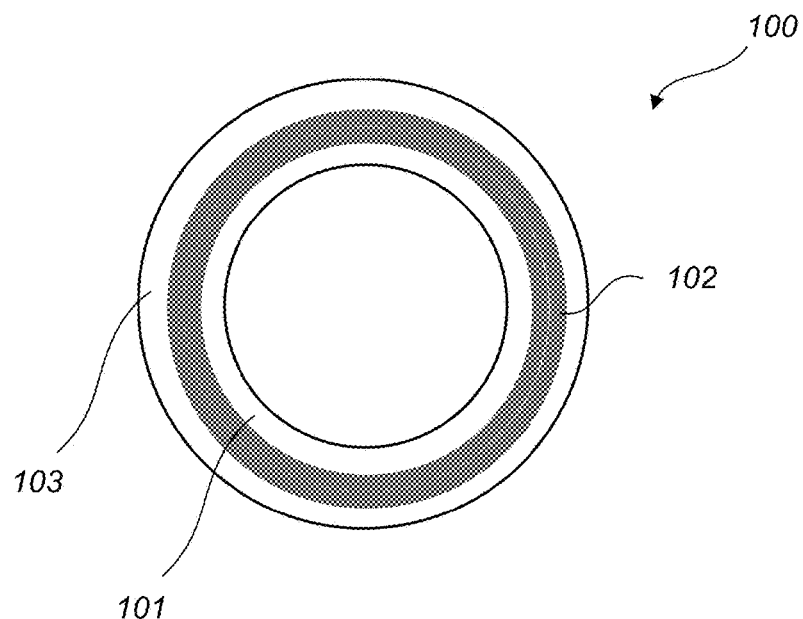
FIG. 1 illustrates a uRTP body.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Throughout this description, reference will be made to an unbonded reinforced thermoplastic pipe (uRTP). It will be understood that a uRTP is an assembly of a portion of a uRTP body, or pipe body, and one or more end fittings in each of which a respective end of the uRTP body is terminated. FIG. 1 illustrates the cross section of an example uRTP body 100 formed from a combination of layered materials that form an unbonded pressure-containing conduit. It will be appreciated that the present disclosure is not limited to the example shown in FIG. 1.

As illustrated in FIG. 1, uRTP body 100 includes in cross section a fluid retaining liner 101 which comprises a polymer layer that ensures internal fluid integrity. It is to be understood that this layer may itself comprise a number of sub-layers. It will be appreciated that the fluid retaining liner 101 may be referred to as a liner.

An intermediate layer, or intermediate reinforcement layer 102, is a structural layer that increases the resistance of the uRTP to internal pressure. The layer also structurally supports the fluid retaining liner 101, and typically may be formed from a construction of tapes wound with a lay angles between 15° and 90° to the axis of the uRTP (and typically at around +/−)55°. The reinforcement layer may comprise at least one layer of spirally wound reinforcement tapes, comprising at least one polymer layer reinforced with filaments of any or a combination of glass, carbon, basalt, aramid, tensilized polyester or metal fibers or wires. In this case the reinforcements may be substantially aligned in the longitudinal direction of the tape and embedded within, or adhered to, or sandwiched between, the at least one polymer layer. A reinforcement tape may also comprise warp and weft fibers of similar or different materials or sizes so that the longitudinally aligned fibers/bundles/strands are bound or fixed in position with respect to one another in a woven fiber tape. The reinforcements may comprise long discrete fibers, or may be bundled, or twisted together as strands. Alternatively, reinforcement fibers may be braided around the pipe, or bundles of fibers may be constrained within a braided element, the braided elements being spirally wound or braided around the inner polymer barrier layer of the pipe as reinforcements. Fibers and/or strands or braids of fibers may be wound around the pipe in a helical manner, with lay angles optimized for pipe performance (the higher the angle the greater the pressure retainment capability, the lower the angle the greater the tension capability), or interwoven into a braid around the pipe. Layers of reinforcements may be applied sequentially at different angles to optimize and torsionally balance the structure in manufacture and use.

The uRTP body also typically includes an outer protective sheath 103, which comprises a polymer layer used to protect the pipe against penetration of water and other external environments which might damage the reinforcement layer of the uRTP.

Each uRTP comprises at least one end portion, sometimes referred to as a segment or section of uRTP body 100 together with an end fitting located at at least one end of the uRTP. An end fitting provides a mechanical device which forms the transition between the uRTP body and a standard flange-type connector (or similar). The different pipe layers as shown, for example, in FIG. 1 are terminated in the end fitting in such a way as to transfer the load between the uRTP and the connector.

Figure 2:
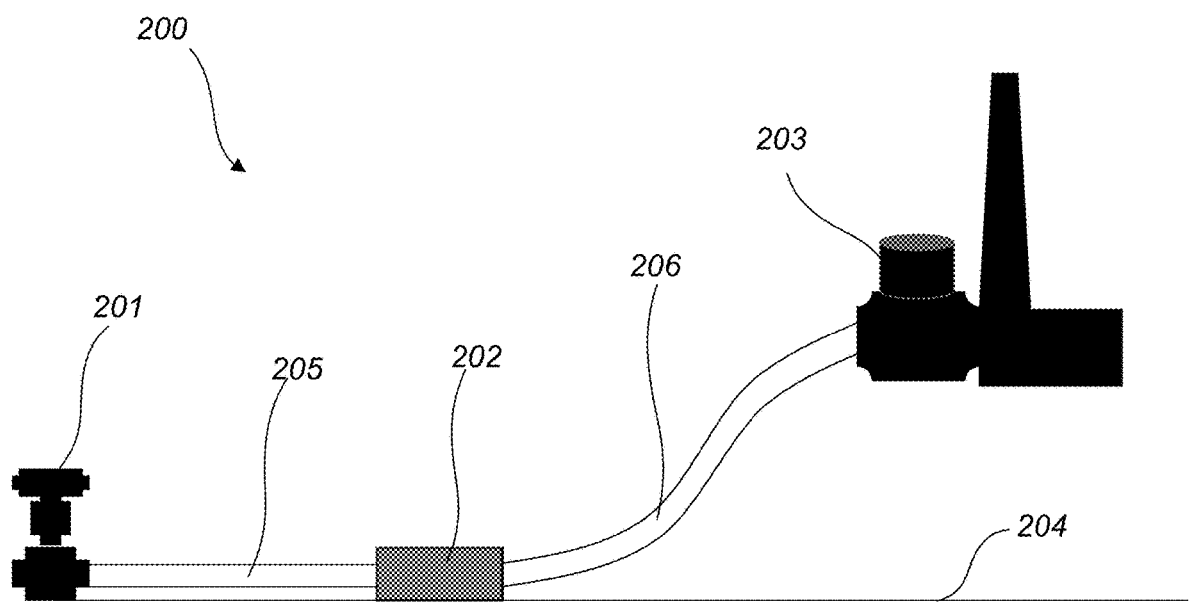
FIG. 2 illustrates a riser assembly.

FIG. 2 illustrates a uRTP facilitated development 200 suitable for transporting production fluid such as oil and/or gas and/or water from a well-head location 201 to a processing facility 203. For example, in FIG. 2 the well-head location 201 includes uRTP flow lines 205, 206. The uRTP flow lines 205, 206 comprise a uRTP, wholly or in part, resting on the ground 204 or buried below the ground and used in a static application. The processing facility 203 may be provided at some remote distance from the well-head and there may be intermediate pumping and/or processing or control equipment represented by 202. The uRTP pipes 205, 206 may comprise segments of uRTP body with connecting end fittings.

It will be appreciated that there are different constructions of uRTP, as is well-known by those skilled in the art. Embodiments may be used with any construction of uRTP.

Figure 3A:
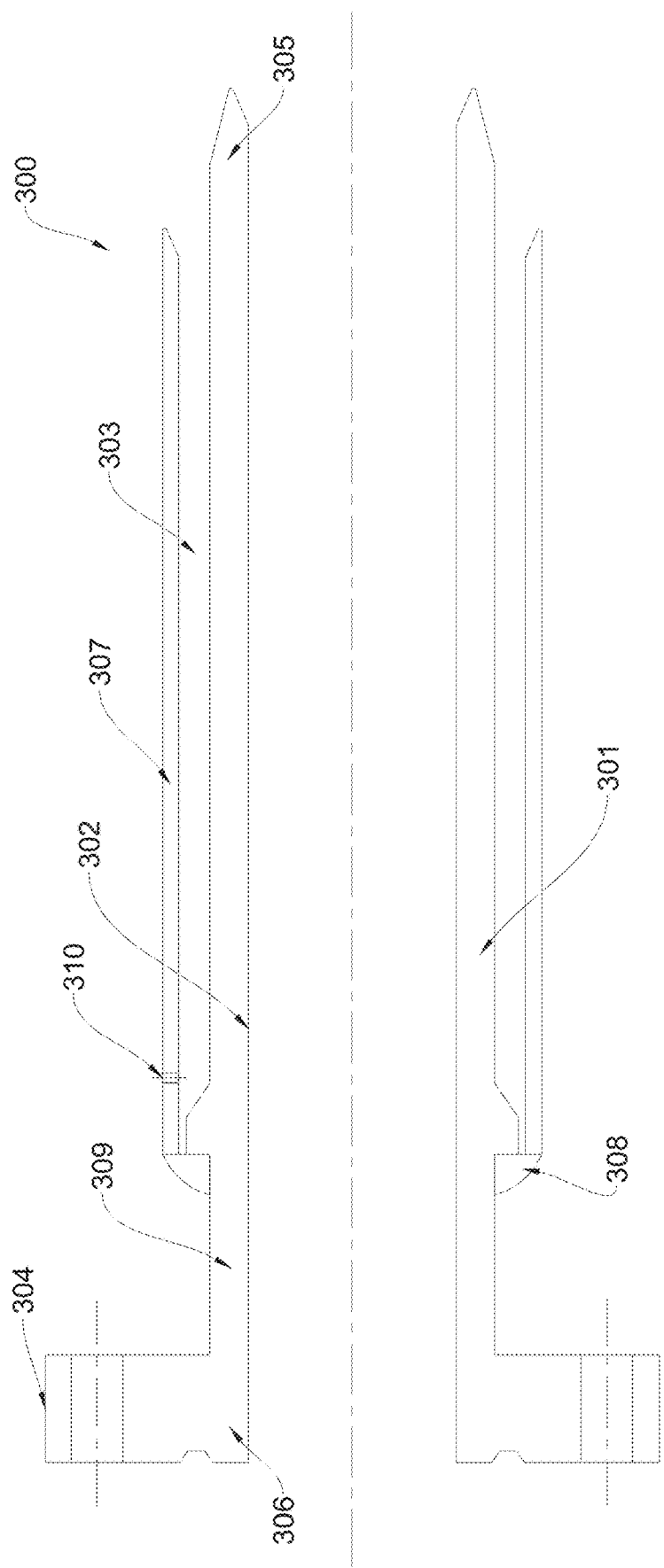
FIGS. 3a-b illustrate a swage end fitting according to the prior art.
Figure 3B:
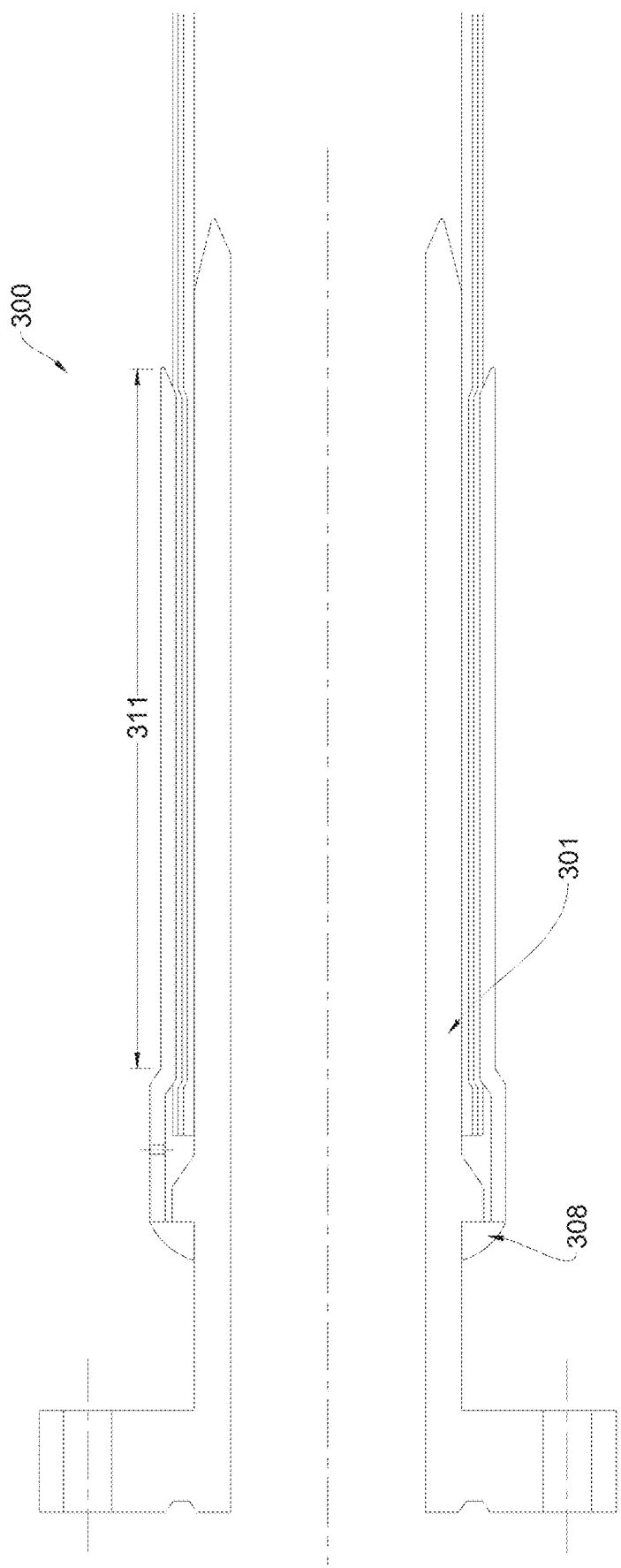

FIGS. 3a and 3b illustrate an example of a swage end fitting as described in the background section which is suitable for use with a uRTP. FIG. 3a shows the end fitting before swaging and FIG. 3b presents a representation of the uRTP body swaged into the same end fitting. The examples of the uRTP presented with respect to FIGS. 4-17 are compatible for use with the swage end fitting of FIG. 3. However, it would be understood that the uRTP presented with respect to FIGS. 4-17 may be compatible with other types of end fitting.

Figure 4:
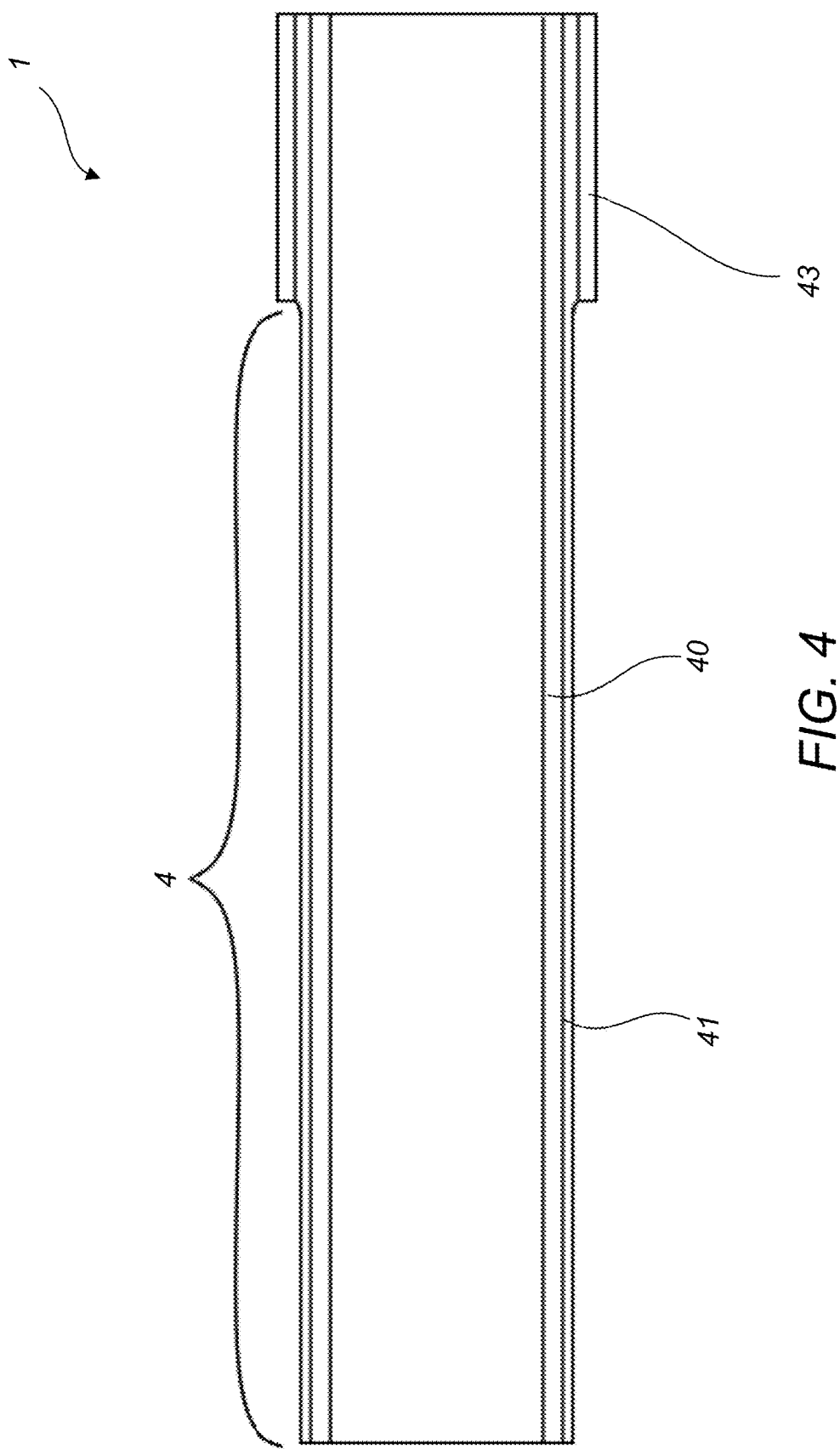
FIG. 4 illustrates a uRTP body with a bonded end portion.

Turning now to FIG. 4 there is shown a schematic of a first example of a pipe body 1 for a uRTP. The pipe body 1 may be the same as the uRTP body 100 shown in FIG. 1. However, in a most general sense, the pipe body 1 is a coaxial structure including three or more layers (a fluid retaining liner, an intermediate layer and a protective sheath).

The pipe body 1 has a fluid retaining liner 40 (which is, or is similar to, the fluid retaining liner 101 in the uRTP of FIG. 1). The fluid retaining liner 40 forms the innermost layer of the flexible pipe body 1, in this example. In this example the fluid retaining liner 40 is manufactured from a thermoplastic. Any suitable thermoplastic may be used, for example polyethylene of raised temperature resistance (PE-RT).

The flexible pipe body 1 has an intermediate layer 41. The intermediate layer 41 has a plurality of windings of at least one tape element. In this example the intermediate layer 41 equates to the layer 102 of the pipe body of FIG. 1 — that is, the intermediate layer 41 may include one or more layers of tape for reinforcing the uRTP and increasing the pressure containment capability of the uRTP. The one or more layers of tape comprise reinforcement filaments within a thermoplastic matrix and the axes of the reinforcement filaments are substantially parallel to the axis of the tape. The intermediate layer 41 is located radially outwardly of the fluid retaining liner 40. In this example, the intermediate layer 41 is immediately adjacent, or in engagement with, the fluid retaining liner 40.

The flexible pipe body 1 has an outer, or protective sheath 43, located radially outwardly of the intermediate layer 41. In this example, the protective sheath 43 is manufactured from a thermoplastic. Any suitable thermoplastic may be used, for example HDPE. This layer equates to the layer 103 in FIG. 1.

The flexible pipe body 1 has an end portion 4 for terminating the flexible pipe body 1 at an end fitting (not shown). At the end portion 4, and only at the end portion 4, the intermediate layer 41 is bonded to the fluid retaining liner 40. Away from the end portion 4, the intermediate layer 41 is unbonded to the fluid retaining liner 40, remaining in the as manufactured state for this type of unbonded construction pipe.

In this example the protective sheath 43 does not extend over the end portion 4 as it has been at least partially removed. Also in this example, the protective sheath 43 is not bonded to the intermediate layer 41. That is, away from the end portion 4 there is no bonding between the layers of the pipe body 1.

The length of the end portion 4 is determined according to the type and size of end fitting to be used. In general, the end portion 4 is long enough to ensure that a strong connection is made with the end fitting. Typically, although not exclusively, the end portion 4 is longer than the part of the end fitting which is inserted into the end portion 4. The length of the end portion 4 is limited to that which is necessary to achieve the required connection strength with the end-fitting, whilst avoiding unnecessary bonding of the pipe layers. In this example, the end portion is between approximately 100 mm and 1000 mm, but it will be appreciated that other lengths are possible. For example, the end portion might be between approximately 200 and 800 mm, for example 300 mm.

The at least one tape element of the intermediate layer 41 may be a polymer or composite or a combination of materials. In this example, the at least one tape element of the intermediate layer 41 is formed from a thermoplastic matrix material. The at least one tape element may also include reinforcement filaments. The axes of the reinforcement filaments may be substantially parallel to the axis of the tape. In this example the reinforcement filaments are glass fibers, and the matrix is manufactured using high-density polyethylene (HDPE).

The at least one tape element of the intermediate layer 41 is wound around the fluid retaining liner 40. The intermediate layer 41 may be formed by windings of a single tape element or several tape elements. The at least one tape layer may be wound around the fluid retaining liner 40 at an angle of between approximately 15° and 90° with respect to a central axis of the pipe body 1. The windings within the intermediate layer 41 may be arranged into one or more 'sub-layers' (that is, whereby subsequent windings overly previous windings). In this example the intermediate layer 41 comprises 18 sub-layers of tape. Adjacent windings of the at least one tape element within each sub-layer may abut or overlap slightly.

In use, the bonded end portion 4 is terminated in an end fitting (for example that shown in FIG. 3). That is, the end fitting is secured inside of the fluid retaining liner 40 to terminate the pipe body.

When the end fitting is attached to the end portion 4, hoop strain is generated in the fluid retaining liner 40, which can cause failure due to plastic deformation, fracture or creep, as explained previously. By bonding the intermediate layer 41 to the fluid retaining liner 40 the effective thickness of the wall of the pipe body 1 at the end portion 4 is increased, thereby reducing the amount of hoop strain. Also, the reinforcement filaments in the intermediate layer 41 further reduce the hoop strain by increasing the elastic modulus of the pipe wall in the axial direction of the filaments. Furthermore, the hoop strain is reduced without the requirement to bond the entire pipe body 1. This means that the remainder of the pipe body 1, away from the end portion 4, retains the unbonded flexibility, as the intermediate layer 41 can move relative to the fluid retaining liner 40. Furthermore, the manufacturing cost and time of only bonding the intermediate layer 41 to the fluid retaining liner 40 at the end portion 4, is much less than the manufacturing cost and time of bonding along the entire pipe body 1.

In this example, the intermediate layer 41 is bonded to the fluid retaining liner 40 via thermal fusion. That is, the intermediate layer 41 is bonded to the fluid retaining liner 40 by applying heat to the intermediate layer 41 and/or the fluid retaining liner 40. For example, the at least one tape layer of the intermediate layer 41 may be heated so that the thermoplastic matrix thereof fuses with the fluid retaining liner 40. Any adjacent tape windings/sub-layers of the intermediate layer 41 may also be fused together during the heating process.

In this example heat is applied via a heat gun. In use (i.e. during the application of heat), the heat gun may be traversed along the length of the end portion 4 while the pipe body 1 is rotated. Alternatively, the heat gun may be rotated around the end portion 4 (in the case where a spool of the pipe body 1 is too long to rotate). In other examples heat may be applied by inserting the end portion 4 into an oven or through use of an infra-red heat source.

The intermediate layer 41 may be wrapped in a heat resistant and/or a heat shrinkable tape prior to heating. For example, the intermediate layer 41 may be wrapped in a polyimide tape prior to heating. The polyimide tape protects the intermediate layer from burning during the application of heat thereto. The polyimide tape may be heat-shrinkable, in which case the polyimide tape will compress the intermediate layer 41 to the fluid retaining liner 40 during heating, to remove air voids therefrom.

Figure 7:
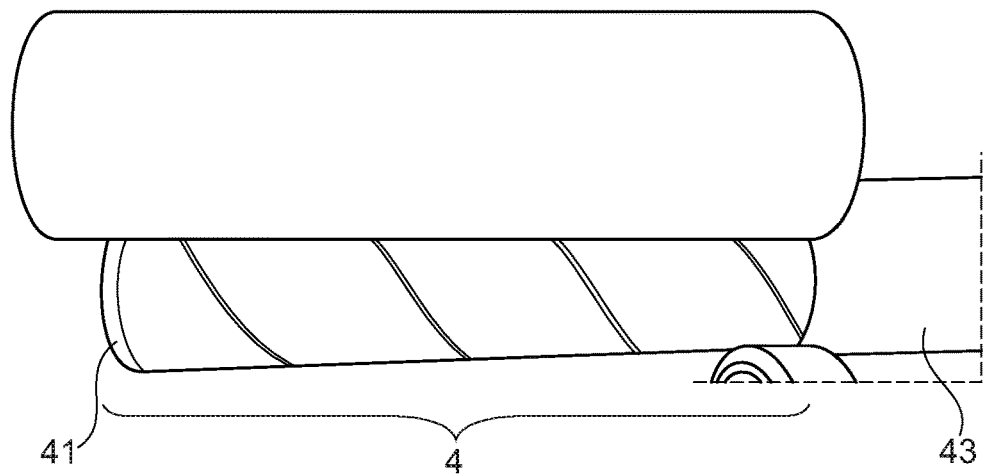
FIG. 7 illustrates a protective sheath being removed from the end portion.

The heat required for thermal fusion may be applied to the intermediate layer 41 and fluid retaining liner 40 via the protective sheath 43. Alternatively, heat may be provided directly to the intermediate layer 41. This may require the removal of the protective sheath 43 at the end portion 4 (i.e. to arrive at the pipe body shown in FIG. 4). This may be achieved via any suitable method, for example using a knife to cut along the axial length of the part of the protective sheath 43 to be removed and then around the circumference of the protective sheath 43. FIG. 7 shows a section of the protective sheath 43 which has been removed from the end portion 4, and the exposed, unbonded tape layers of the intermediate layer 41.

Figure 5:
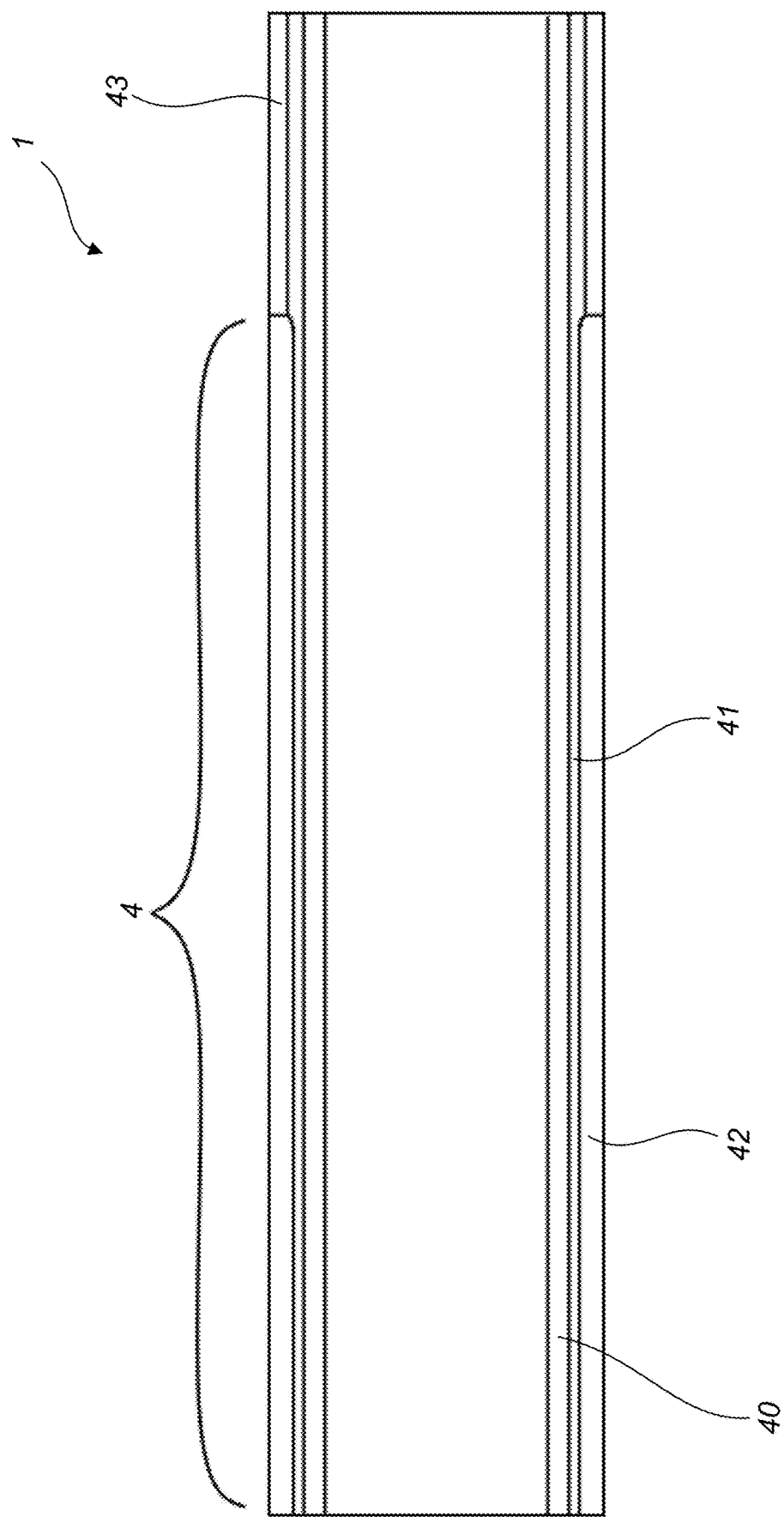
FIG. 5 illustrates a uRTP body with a bonded end portion and a cover layer bonded to the intermediate layer at the end portion.

Turning now to FIG. 5, another example of the disclosure is shown, which is the same as the example shown in FIG. 4 except that a cover layer 42 is located radially outwardly of the intermediate layer 41 at the end portion 4. The cover layer 42 protects the end portion 4 of the pipe body 1 against penetration of seawater and other external environments, corrosion, abrasion and mechanical damage. In this example the cover layer 42 abuts the protective sheath 43. However, a gap may be provided therebetween.

The cover layer 42 may be of any suitable material and configuration to offer the aforementioned protection to the end portion 4.

In one example, the cover layer 42 is provided by at least one winding of a further tape element or sheet material. The further tape element may be wound at approximately 90° with respect to the central axis of the pipe body 1. That is, subsequent windings of the further tape element may generally overlap to build up the thickness of the cover layer. Although any number of windings of the further tape element are envisaged, typically the number of windings is such that when the cover layer 42 is in situ, the overall diameter of the pipe body 1 at the end portion 4 is at least as large as the diameter of the pipe body 1 away from the end portion 4. In some examples, the cover layer 42 may be wound until the overall diameter of the pipe body 1 is larger than necessary (for termination) and then machined down to the required diameter to ensure uniformity. Once the desired thickness is achieved, the further tape element (or an additional further tape element) may be wound again at an adjacent position until the cover layer is of the desired length.

The further tape element may be the same or similar to the tape element used for the intermediate layer. For example, the further tape element may have reinforcement filaments within a thermoplastic matrix material. The axes of the reinforcement filaments may be substantially parallel to the axis of the tape. The reinforcement filaments may be glass fibers, and the matrix may be manufactured using HDPE.

In another example, the cover layer 42 may comprise by an annular sleeve. The annular sleeve may be either an extruded thermoplastic sleeve or manufactured from at least one winding of a further tape element, similar to the first example of the cover layer 42. Alternatively, the annular sleeve may be of the same material as the protective sheath 43. The annular sleeve may be slid over the intermediate layer 41 of the end portion 4. The annular sleeve may be slid over the intermediate layer 41 either before or after the intermediate layer 41 is bonded to the fluid retaining liner 40.

In all examples of the cover layer 42, bonding the cover layer 42 to the intermediate layer 41 is advantageous as the effective pipe wall thickness at the end portion 4 is increased yet further, and so reduces the hoop strain when an end-fitting is applied. Furthermore, providing reinforcement filaments in the cover layer 42 at approximately 90° with respect to the central axis of the pipe body 1 increases the elastic modulus of the pipe wall in the hoop direction, thereby reducing hoop strain further.

The heat required for thermal fusion may be applied to the intermediate layer 41 and fluid retaining liner 40 via the cover layer 42. The cover layer 42 may be covered in polyimide tape prior to heating, to protect it from burning. The polyimide tape may be heat-shrinkable to compress the underlying layers, during heating, to remove air voids therefrom.

The cover layer 42 may be bonded to the intermediate layer 41. If so, the cover layer 42 also strengthens the end portion 4 due to engagement, through bonding, with the intermediate layer 41. Bonding of the cover layer 42 to the intermediate layer 41 may occur at the same time that the intermediate layer 41 is bonded to the fluid retaining liner 40 or a separate step may be used (i.e.

the intermediate layer 41 may first be bonded to the fluid retaining liner and then subsequently to the cover layer).

Figure 6:
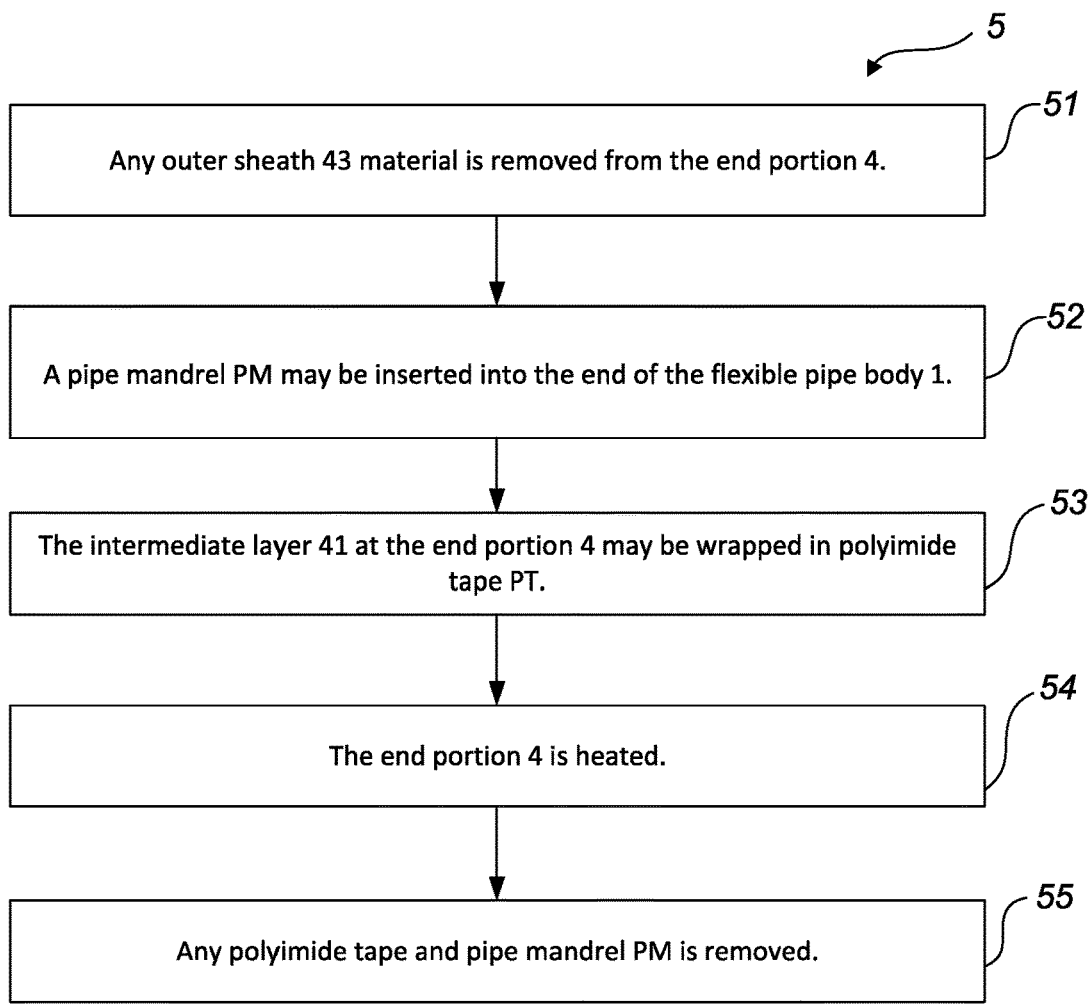
FIG. 6 illustrates a manufacturing process for bonding and intermediate layer to a fluid retaining liner of the end portion of the uRTP body.

Turning now to FIG. 6, an example process 5 for bonding the intermediate layer 41 and the fluid retaining liner 40 at the end portion 4 is shown. This process 5 is suitable for a pipe body which does not have a cover layer 42 located at the end portion 4, as well as a pipe body 1 which does have a cover layer 42 located at the end portion 4. It would be understood that the example of FIG. 6 is an example only and individual steps may be omitted or lifted in isolation from the remaining steps shown in FIG. 6.

At a first step 51, if the end portion 4 of the pipe body 1 has a protective sheath 43 thereon, then this is removed from the end portion 4 to expose the intermediate layer 41. This may be achieved via any suitable method, for example using a knife to cut along the axial length of the part of the protective sheath 43 to be removed and then around the circumference of the protective sheath 43.

At a second step 52, a pipe mandrel PM may be inserted into the end portion 4 of the pipe body 1. For example, the inserted part of the pipe mandrel PM may be cylindrical in shape and have an outer diameter such that there is a tight clearance fit between the pipe mandrel PM and the inside surface of the fluid retaining liner 40. The pipe mandrel PM helps maintain the circularity of the fluid retaining liner 40 during heating of the end portion 4. In general, the pipe mandrel PM extends across at least the entire length of the end portion 4.

Figure 8:
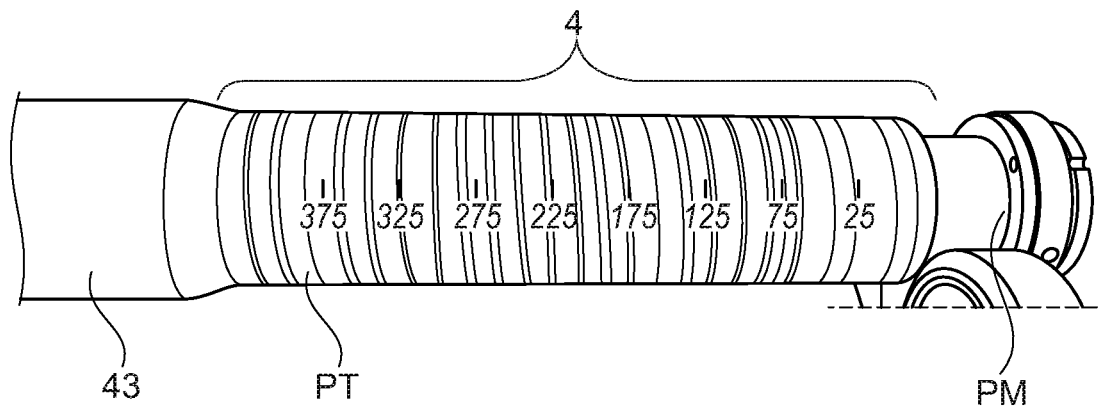
FIG. 8 illustrates polyimide tape covering the exposed intermediate layer, and a pipe mandrel inserted into an end of the uRTP body.

At a third step 53 the exposed, unbonded tape layers of the intermediate layer 41 may be wrapped in polyimide tape PT. As shown in FIG. 8, the polyimide tape PT may also be wrapped around the end of the protective sheath 43 adjacent to the end portion 4 to prevent burning of the protective sheath 43 when heat is applied. Also shown is the pipe mandrel PM protruding from the end of the pipe body 1. In this case the pipe mandrel PM protrudes such that the surface of the pipe mandrel PM can be supported by a roller.

At a fourth step 54, heat is applied to the outside surface of the polyimide tape PT.

Figure 9:
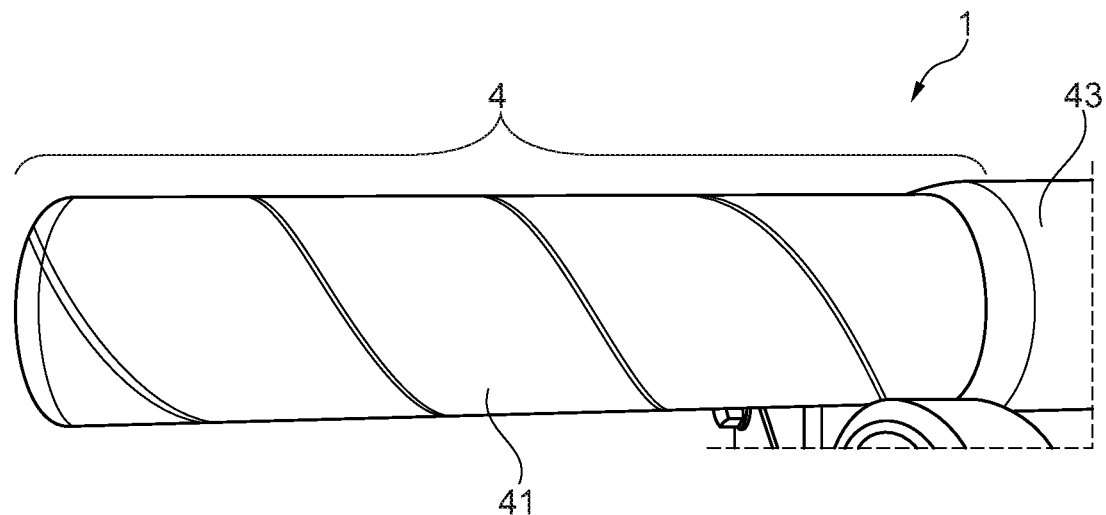
FIG. 9 illustrates the intermediate layer bonded to the fluid retaining liner at the end portion.

At a fifth step 55 the end portion 4 is allowed to cool, any polyimide tape PT is removed, and the pipe mandrel PM is removed. FIG. 9 shows the resulting end portion 4 with the intermediate layer 41 bonded to the fluid retaining liner 40.

Figure 10:
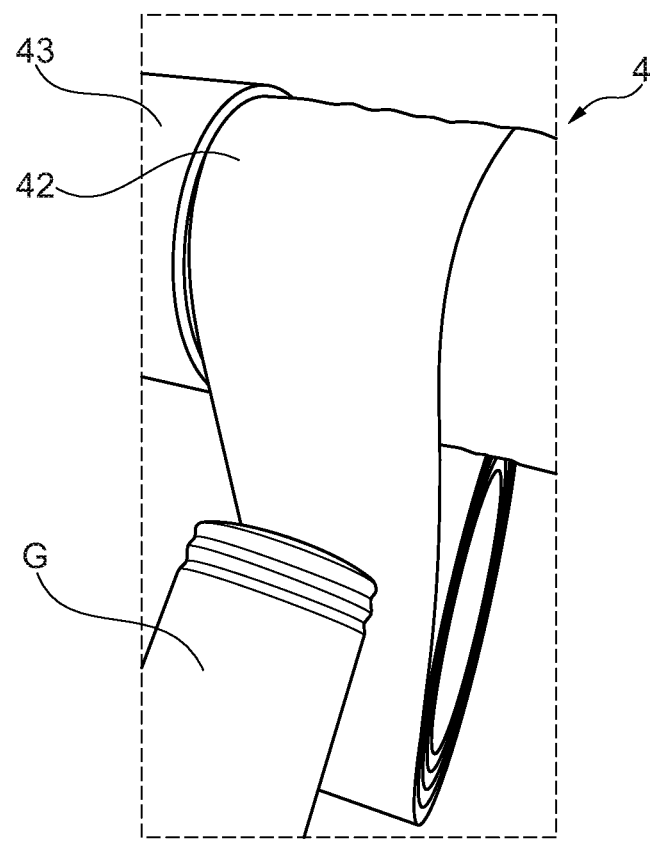
FIG. 10 illustrates sleeve tape being wound onto the intermediate layer.

FIG. 10 illustrates an example production method for a cover layer 42 formed from a further tape element or sheet material. In this example the further tape element is wound directly around the bonded intermediate layer 41. In this example, the further tape element is wound at approximately 90° with respect to the central axis of the pipe body 1. As such, the edges of subsequent further tape windings are substantially aligned. Tension may be applied to the further tape element as it is wound, to compress any subsequent layers/windings of the further tape element together, and to compress the further tape element onto the intermediate layer 41. In this example the further tape element is heated by the heat gun G as it is wound onto the end portion 4.

Figure 11:
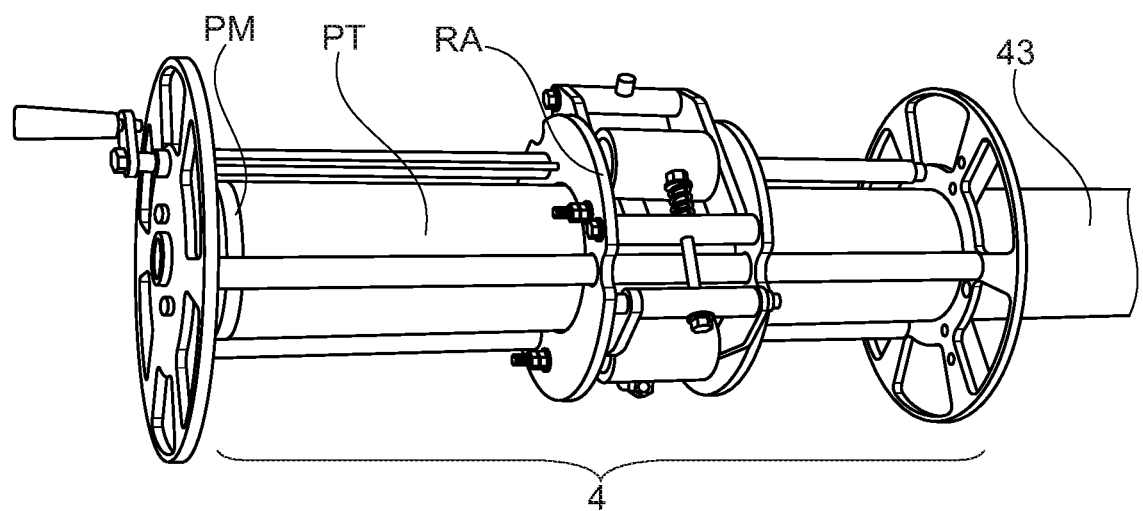
FIG. 11 illustrates a roller assembly for removing air voids between the layers at the end portion.

However, the further tape element may instead be wound onto the end portion 4, and then the end portion 4 heated, for example in an oven or using heater blankets. Air voids can be removed from the end portion by the optional step of using a roller assembly RA, as shown in FIG. 11, to compress the cover layer 42, intermediate layer 41 and fluid retaining liner 40 together and onto the pipe mandrel PM.

Figure 12:
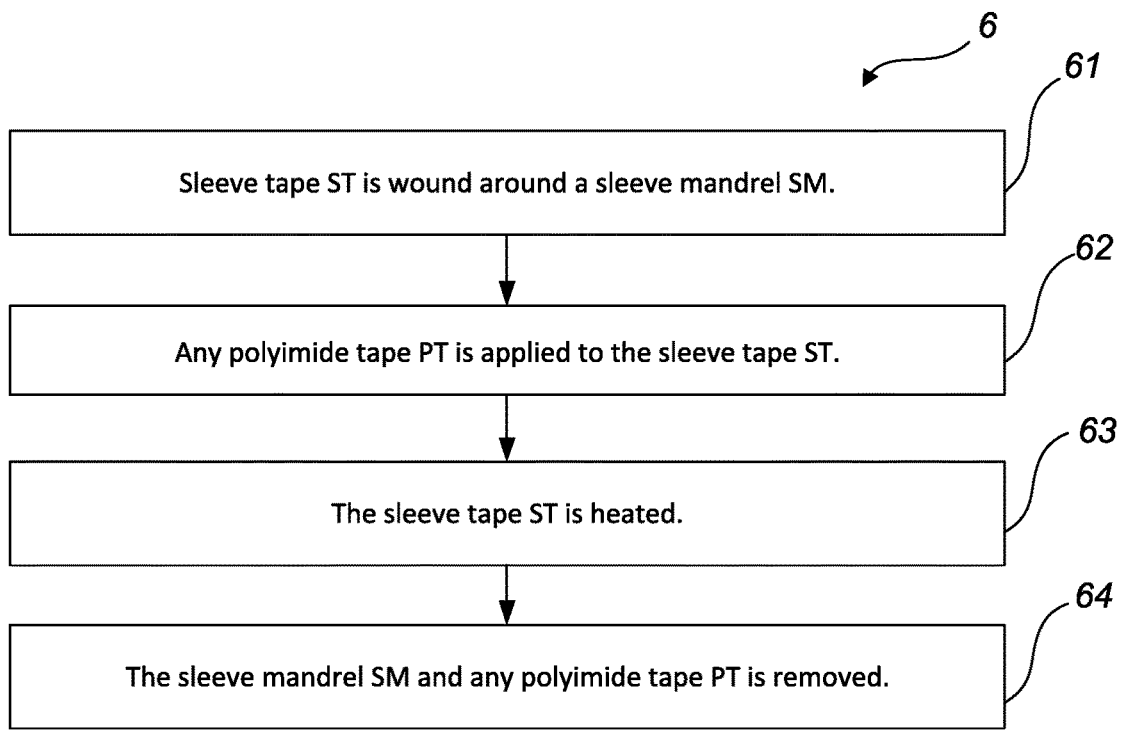
FIG. 12 illustrates a manufacturing process for winding sleeve tape directly onto the end portion.

Turning now to FIG. 12 there is shown an example process 6 for manufacturing a cover layer comprising annular sleeve using at least one winding of a further tape element. It would be understood, that the example of FIG. 12 is an example only and individual steps may be omitted or lifted in isolation from the remaining steps shown in FIG. 12.

Figure 13:
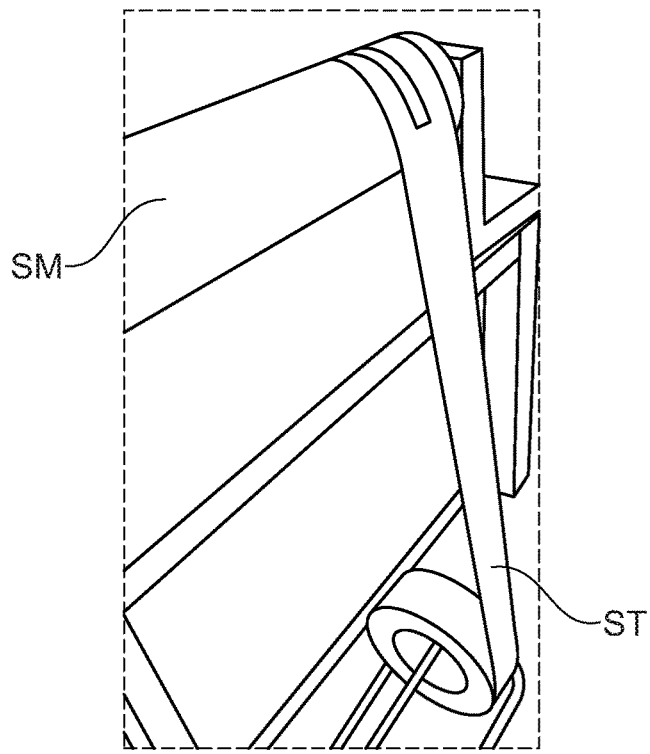
FIG. 13 illustrates sleeve tape being wound onto a mandrel for producing an annular sleeve.
Figure 14:
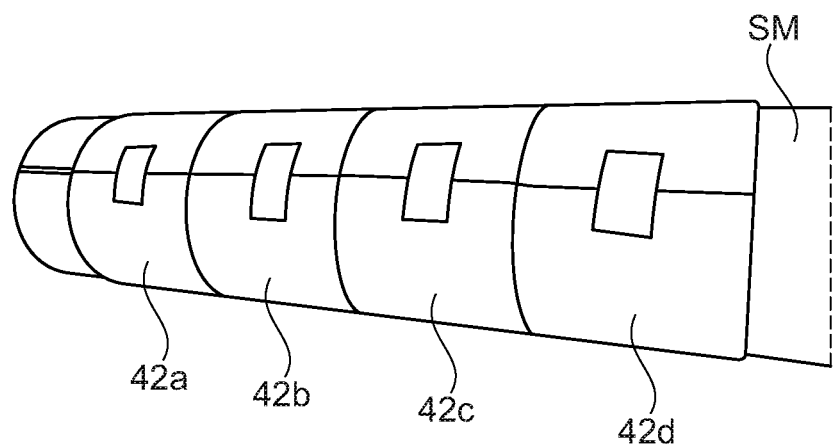
FIG. 14 illustrates individual windings of sleeve tape wound onto a sleeve mandrel for producing the annular sleeve.

In a first step 61 a continuous spool of sleeve tape ST is wound around a sleeve mandrel SM, as shown in FIG. 13. The sleeve tape ST of this example is the same as the tape used for the intermediate layer 41. However, it will be appreciated that any suitable sleeve tape ST may be used. As the sleeve tape ST is wound, tension may be applied thereto to compress the sleeve tape ST layers together. The sleeve tape ST is wound until the desired number of layers are present. The sleeve tape ST may be wound in the hoop direction, with edge alignment of the layers maintained. In this case individual windings 42a-d, as best shown in FIG. 14, are located adjacent to each other along the length of the sleeve mandrel SM, to achieve the desired annular sleeve length.

In a second step 62 the individual windings 42a-d are optionally covered in polyimide tape PT. The polyimide tape PT is a heat shrinkable and heat resistant tape which shrinks and protects the sleeve tape ST from burning when external heat is applied.

Figures 15, 17:
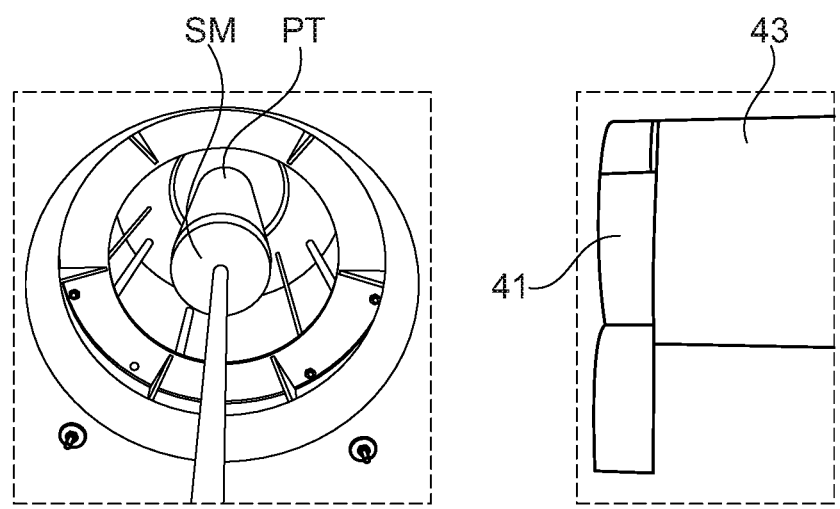
FIG. 15 illustrates the annular sleeve being heated in an infra-red oven.
FIG. 17 illustrates the removal of protective sheath material at an end portion of a uRTP.

In a third step 63 the wound sleeve tape ST is heated (for example using a heat gun or using an oven). FIG. 15, shows the individual tape windings 42a-d, polyimide tape PT and sleeve mandrel SM in an oven. In this example the oven is an infra-red oven, but any oven which provides external heat is envisaged. During heating, the ST layers are consolidated into a substantially unitary sleeve. The sleeve mandrel SM maintains the circularity of the annular sleeve during manufacture.

In a fourth step 64 the sleeve tape is allowed to cool. The sleeve mandrel SM is then removed from the annular sleeve.

Figure 16:
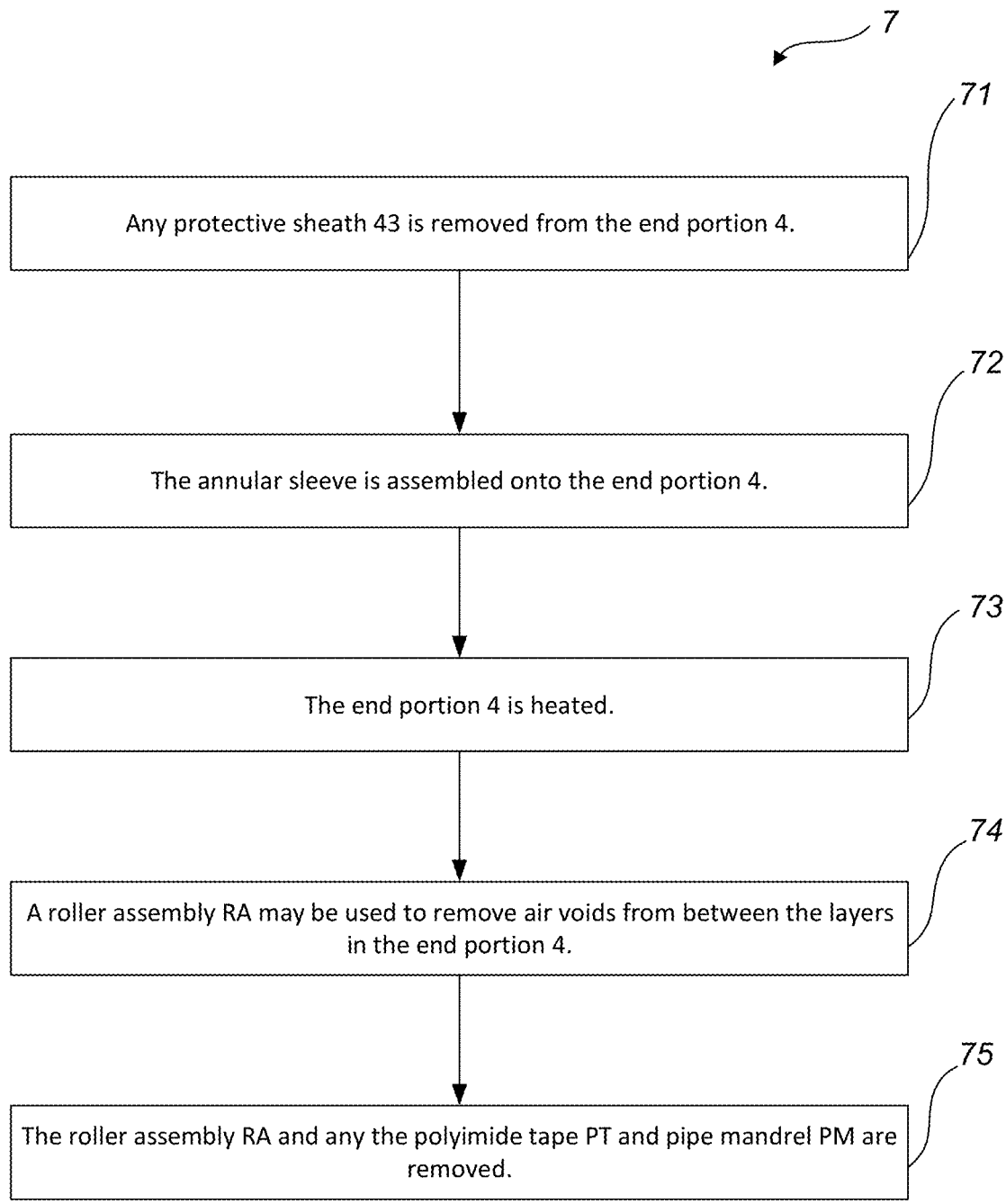
FIG. 16 illustrates a manufacturing process for assembling the annular sleeve onto the end portion.

Turning now to FIG. 16, an example process 7 for assembling an annular sleeve to an end portion 4 of a pipe body 1 is shown. This process is suitable for the annular sleeve manufactured according to the process 6 of FIG. 12, or another annular sleeve.

In a first step 71 the protective sheath 43 is removed from the end portion 4. In a second step the annular sleeve is assembled onto the end portion 4.

The protective sheath 43 may be removed from the entirety of the end portion 4 in a single operation (as shown in FIG. 7) prior to assembly of the annular sleeve. Alternatively, a small portion (for example between 25 mm and 50 mm of the protective sheath 43) at an end of the pipe body 1 may first be removed, as shown in FIG. 17. This exposes the ends of the unbonded tape layers of the intermediate layer 41. The annular sleeve is assembled over the unbonded ends of the intermediate layer 41. The protective sheath 43 is then removed from the remainder of the length of the end portion 4. In assembling the annular sleeve over the exposed ends of the intermediate layer 41 before the remainder of the protective sheath 43 is removed from the end portion, the tape layers can be held in place while the remainder of the protective sheath 43 is removed.

To assemble the annular sleeve onto the end portion 4, the annular sleeve may be rotated onto the end portion 4 in the same direction as the windings of the tape layers of the intermediate layer 41, to prevent unravelling of the tape layers. If a pipe mandrel PM is used, then this is inserted into the end of the pipe body 1.

In a third step 73 the end portion 4 is heated to fuse the intermediate layer 41 to the fluid retaining liner 40, and to fuse the annular sleeve to the intermediate layer 41. The pipe mandrel PM maintains the circularity of the fluid retaining liner 40 during heating.

In a fourth step 74 a roller assembly RA may be used to compress the annular sleeve. In particular, the roller assembly RA further compresses the annular sleeve, intermediate layer 41 and fluid retaining liner 40 onto the pipe mandrel PM to remove air from between the layers. This increases the structural integrity of the end portion 4. If a pipe mandrel PM is used, then this maintains the circularity of the fluid retaining liner 40 during rolling.

In a fifth step 75, if a roller assembly RA is used then this is removed from the end portion 4, and the end portion 4 is cooled. Once the end portion 4 is cooled any polyimide tape PT and pipe mandrel PM are removed therefrom.

A variation to the assembly process 6 is envisaged, where the roller assembly RA is present inside of the oven, such that the annular sleeve, intermediate layer 41 and fluid retaining liner 40 are compressed inside the oven.

Various modifications to the detailed arrangements as described above are possible. For example, instead of providing mandrels inside of the end portion 4 during manufacture, there may instead be provided a pressurizing bladder. Alternatively, the inside of the fluid retaining liner may be pressurized.

Although in the illustrated examples only three pipe layers are shown (fluid retaining liner, intermediate layer and protective sheath), it will be appreciated that any number of layers may be present.

It will be clear to a person skilled in the art that features described in relation to any of the embodiments described above can be applicable interchangeably between the different embodiments. The embodiments described above are examples to illustrate various features of the invention.

The reader's attention is directed to all papers and documents which are filed concurrently with or previous to this specification in connection with this application and which are open to public inspection with this specification, and the contents of all such papers and documents are incorporated herein by reference.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

We claim:
1. A pipe body for an unbonded reinforced thermoplastic pipe (uRTP) comprising:
   a fluid retaining liner;
   an intermediate layer located radially outwardly of the fluid retaining liner; and a protective sheath located radially outwardly of the intermediate layer;

wherein the pipe body comprises an end portion for terminating the pipe body at an end fitting, wherein, at the end portion, the intermediate layer is bonded directly to the fluid retaining liner, and, away from the end portion, the intermediate layer remains unbonded to the fluid retaining liner; and wherein one or more:
- the intermediate layer comprises reinforcement filaments within a thermoplastic matrix, or bonded to a thermoplastic tape;
- the intermediate layer comprises windings of at least one tape element comprising reinforcement filaments within a thermoplastic matrix, or bonded to a thermoplastic tape; and/or
- the pipe body further comprises a cover layer located radially outwardly of the intermediate layer at the end portion.

2. The pipe body according to claim 1, wherein the length of the end portion is between approximately 100 mm and 1000 mm.

3. The pipe body according to claim 1, wherein the cover layer is bonded to the intermediate layer.

4. The pipe body according to claim 1, wherein the cover layer comprises at least one winding of a further tape element or sheet material; and
wherein the at least one winding of the further tape element or sheet material is oriented at approximately 90° with respect to a central axis of the pipe body.

5. The pipe body according to claim 1, wherein the cover layer comprises an annular sleeve.

6. The pipe body according to claim 1, wherein the axes of the reinforcement filaments are substantially parallel to the axis of the at least one tape element; and
wherein the windings of the at least one tape element are helically wound or are braided around the pipe body.

7. The pipe body according to claim 6, wherein the at least one tape element is wound around the fluid retaining liner at an angle of between approximately 15° and 90° with respect to a central axis of the pipe body.

8. An unbonded reinforced thermoplastic pipe (uRTP) comprising:
a pipe body comprising:
- a fluid retaining liner;
- an intermediate layer comprising reinforcement filaments within a thermoplastic matrix, or bonded to a thermoplastic tape, and being located radially outwardly of the fluid retaining liner;
- a protective sheath located radially outwardly of the intermediate layer; and
- an end fitting;

wherein the pipe body comprises an end portion for terminating the pipe body at the end fitting;

wherein, at the end portion, the intermediate layer is bonded directly to the fluid retaining liner, and, away from the end portion, the intermediate layer remains unbonded to the fluid retaining liner; and wherein, the end portion is inserted into an annular recess in the end fitting which is swaged onto the end portion of the pipe body.

9. A method of manufacturing a pipe body for an unbonded reinforced thermoplastic pipe (uRTP) comprising:
locating an intermediate layer radially outwardly of a fluid retaining liner;
locating a protective sheath radially outwardly of the intermediate layer; and
bonding the intermediate layer directly to the fluid retaining liner at an end portion of the pipe body, such that the intermediate layer remains unbonded to the fluid retaining liner away from the end portion, the end portion being for terminating the pipe body at an end fitting;

wherein one or more:
- the intermediate layer comprises reinforcement filaments within a thermoplastic matrix, or bonded to a thermoplastic tape;
- the fluid retaining liner comprises windings of at least one tape element and locating the intermediate layer radially outwardly of the fluid retaining liner includes winding the at least one tape element around the fluid retaining liner at an angle of between approximately 15° and 90° with respect to a central axis of the pipe body; and/or
- the method further comprises applying or locating a cover layer radially outwardly of the intermediate layer at the end portion.

10. The method according to claim 9 further comprising at least partly removing the protecting sheath from the end portion of the pipe body before bonding the fluid retaining liner to the intermediate layer.

11. The method according to claim 9 further comprising bonding the cover layer to the intermediate layer.

12. The method according to claim 9, wherein the cover layer comprises an annular sleeve, and locating the cover layer radially outwardly of the intermediate layer at the end portion includes sliding the sleeve onto the intermediate layer.

13. The method according to claim 9, wherein the cover layer comprises at least one winding of a further tape element or sheet material, the at least one winding being orientated at approximately 90° with respect to a central axis of the pipe body.

14. The method according to claim 13, wherein locating the cover layer radially outwardly of the intermediate layer includes winding the further tape element or sheet material around the intermediate layer.

* * * * *